(12) United States Patent
Wang et al.

(10) Patent No.: US 8,584,945 B2
(45) Date of Patent: *Nov. 19, 2013

(54) ENCODED INFORMATION READING TERMINAL WITH WIRELESS PATH SELECTION CAPABILITY

(75) Inventors: Ynjiun P. Wang, Cupertino, CA (US); Huyu Qu, San Jose, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,091

(22) Filed: May 21, 2012

(65) Prior Publication Data
US 2012/0292384 A1    Nov. 22, 2012

Related U.S. Application Data

(60) Division of application No. 13/012,379, filed on Jan. 24, 2011, now Pat. No. 8,181,871, which is a continuation of application No. 11/985,329, filed on Nov. 14, 2007, now Pat. No. 7,874,483.

(51) Int. Cl.
*G06K 7/00* (2006.01)
(52) U.S. Cl.
USPC ......................................................... 235/439
(58) Field of Classification Search
USPC .................................................. 235/439, 435
See application file for complete search history.

(56) References Cited

U.S. PATENT DOCUMENTS

| | | | |
|---|---|---|---|
| 5,029,183 A | 7/1991 | Tymes | |
| 5,157,687 A | 10/1992 | Tymes | |
| 5,479,441 A | 12/1995 | Tymes et al. | |
| 5,943,322 A | 8/1999 | Mayor et al. | |
| 6,067,297 A | 5/2000 | Beach | |
| 6,377,805 B1 | 4/2002 | Anvekar et al. | |
| 6,405,927 B2 | 6/2002 | Sojka et al. | |
| 6,580,981 B1 | 6/2003 | Masood et al. | |
| 6,617,990 B1 | 9/2003 | Lorenzo-Luaces et al. | |
| 6,671,790 B2 | 12/2003 | Gay Sam et al. | |
| 6,687,259 B2 | 2/2004 | Alapuranen | |
| 6,728,232 B2 | 4/2004 | Hasty, Jr. et al. | |

(Continued)

OTHER PUBLICATIONS

Antonio G. Ruzzelli et al., A Low-Latency Routing Protocol for Wireless Sensor Networks, Adaptive Information Cluster, Smart Media Institute in the Department of Computer Science at University College Dublin, 2003, 6 pages., Belfield, Dublin.

(Continued)

*Primary Examiner* — Christle Marshall
(74) *Attorney, Agent, or Firm* — Additon, Higgins, Pendleton & Ashe, P.A.

(57) ABSTRACT

A portable encoded information reading (EIR) terminal for incorporation in a data collection system can comprise a terminal module communicatively coupled to a wireless interface module via a wired interface. The wireless interface module can establish one or more wireless links with one or more peer EIR terminals. The wireless interface module can receive or transmit beacons containing at least an identifier of a path selection protocol which is used for unicast, multicast and broadcast frame transmission within the wireless network. The wireless interface module, responsive to receiving a MAC frame from the terminal module, can forward the MAC frame, according to the path selection protocol, to a peer EIR terminal or to a portal which is capable of routing MAC frames between the wireless network and one or more OSI layer 2 networks.

20 Claims, 9 Drawing Sheets

(56) References Cited

U.S. PATENT DOCUMENTS

| | | | |
|---|---|---|---|
| 6,728,545 | B1 | 4/2004 | Belcea |
| 6,754,188 | B1 | 6/2004 | Garahi et al. |
| 6,771,666 | B2 | 8/2004 | Barker, Jr. |
| 6,807,165 | B2 | 10/2004 | Belcea |
| 6,873,839 | B2 | 3/2005 | Stanforth |
| 7,039,358 | B1 | 5/2006 | Shellhammer et al. |
| 7,088,698 | B1 | 8/2006 | Harsch |
| 7,126,945 | B2 | 10/2006 | Beach |
| 7,874,483 | B2 | 1/2011 | Wang et al. |
| 8,181,871 | B2 * | 5/2012 | Wang et al. ............. 235/439 |
| 2004/0218580 | A1 | 11/2004 | Bahl et al. |
| 2005/0063328 | A1 | 3/2005 | Dunagan et al. |
| 2006/0258322 | A1 | 11/2006 | Conner et al. |
| 2006/0268746 | A1 | 11/2006 | Wijting et al. |
| 2007/0014269 | A1 | 1/2007 | Sherman et al. |
| 2007/0045424 | A1 | 3/2007 | Wang |
| 2007/0050523 | A1 | 3/2007 | Emeott et al. |
| 2007/0140279 | A1 | 6/2007 | Yang et al. |
| 2009/0121021 | A1 | 5/2009 | Wang et al. |
| 2009/0213811 | A1 | 8/2009 | Wang et al. |

OTHER PUBLICATIONS

Atul Adya et al., Architecture and Techniques for Diagnosing Faults in IEEE 802.11 Infrastructure Networks, MobiCom '04, Sep. 26-Oct. 1, 2004, 15 pages, Philadelphia, Pennsylvania, USA.

C. Hedrick, Routing Information Protocol, Rutgers University, Jun. 1988, 29 pages, New Jersey.

Christine E. Jones et al., A Survey of Energy Efficient Network Protocols for Wireless Networks, BBN Technologies, School of EECS at Washington State University, and Telcordia Technologies, 2001, 26 pages., Cambridge, MA., Pullman, WA, and Morristown, NJ.

Cisco Systems, Inc., Routing Information, Internetworking Technologies Handbook, Third Edition, Chapter 47, pp. 1-5, Dec. 1, 2001, Cisco Press, Indianapolis, IN.

D. Franco et al., A New Method to make Communication Latency Uniform, Unviersitat Autonoma de Barcelona Department d'Informatica, 1999, 10 pages., Barcelona, Spain.

Eric Setton et al., Congestion—Optimized Multi-Path Streaming of Video Over Ad Hoc Wireless Networks, Information Systems Laboratory in the Department of Electrical Engineering at Stanford University, 2004, 4 pages, Stanford, CA.

Eric Setton et al., Minimizing Distortion for Multi-Path Video Streaming Over Ad Hoc Networks, Information Systems Laboratory in the Department of Electrical Engineering at Stanford University, 2004, 4 pages, Stanford, CA.

Eun-Sun Jung et al., Power Aware Routing Using Power Control in Ad Hoc Networks, Department of Computer Science at Texas A&M University and the Department of Electrical and Computer Engineering and Coordinated Science Laboratory, University of Illinois, Feb. 2005, 8 pages, College Station, TX and Urbana, IL.

G. Malkin, RIP Version 2, The Internet Society, Nov. 1998, 39 pages.

Gerald Fry et al., Adaptive Routing of QoS-Contrained Media Streams over Scalable Overlay Topologies, Powerpoint Slides, Boston University, 2003, 28 pages, Boston, MA.

Jiancong Chen et al., Mixed Mode WLAN: The Integration of Ad Hoc Mode with Wireless LAN Infrastructure, Department of Computer Science, Electrical & Electronic Engineering at the Hong Kong University of Science and Technology, 2003, 5 pages, Clear water Bay, Kowloon, Hong Kong.

Jharna Chokhawala et al., Optimizing Power Aware Routing in Mobile Ad Hoc Networks, Real-Time Systems Laboratory Department of Computer Science at the University of Houston-University Park, May 2004, 4 pgs., Houston, TX.

Jongman Kim et al., A Low Latency Router Supporting Adaptivity for On-Chip Interconnects, Department of Computer Science and Engineering at Pennsylvania State University, Jun. 2005, 6 pages., University Park, PA.

Lawrence G. Roberts, The Next Generation of IP—Flow Routing, SSGRR 2003S International Conference, Jul. 29, 2003, 11 pages, L'Aquila Italy.

Longbi Liin et al., Power Aware Routing for Multi-hop Networks with Energy Replenishment, Purdue School of Electrical and Computer Engineering and the Department of Electrical and Computer Engineering at the University of Illinois at Urbana-Champaign 2004, 6 pgs.

Mike Woo et al., Power-Aware Routing in Mobile Ad Hoc Networks, Department of ECE at Oregon State University and Aerospace Corporation, 1998, 15 pages., Carvallis, OR and El, Segundo, CA.

Paramvir Bahl et al., SSCH: Slotted Seeded Channel Hopping for Capacity Improvement in IEEE 802.11. Ad-Hoc Wireless Networks, MobiCom '04 Sep. 26-Oct. 1, 2004, 15 pages, Philadelphia, Pennsylvania, USA.

Qun Li et al., Online Power-Aware Routing in Wireless Ad-hoc Networks, Department of Computer Science Dartmouth College, 2001, 11 pages, Hanover, New Hampshire.

Ranveer Chandra, MultiNet: Connecting to Multiple IEEE 802.11 Networks Using a Single Radio, Cornell University, Mar. 2004, 7 pages, Ithaca, NY.

Ratul K. Guha et al., Fair Coalitions for Power-Aware Routing in Wireless Networks, Department of Electrical Engineering and Applied Science, Computer and Information Science, and Electrical Engineering at the University of Pennsylvania, Jul. 20, 2004, 21 pages. Pennsylvania.

Sajith Balraj et al., Unicast Routing in Mobile Ad-Hoc Networks, Department of Computer Science and Engineering at the University of Buffalo, 2000, 11 pages, Buffalo, New York.

Sven Hanemann et al., Reducing Packet Transmissions in Ad Hoc Routing Protocols by Adaptive Neighbor Discovery, Department of Mathematics and Computer Science at the University of Marburg, 2003, 7 pages, Marburg, Germany.

Victor Bahl et al., SSCH: Improving the Capacity of IEEE 802.11 Multihop Networks Using Slotted Seeded Channel Hopping, Powerpoint Slidr, Jun. 23, 2004, 1 page.

Yuan Xue et al., A Location-Aided Power-Aware Routing Protocol in Mobile Ad Hoc Networks, Department of Computer Science at the University of Illinois at Urbana-Champain and the Department of Electrical and Computer Engineering at the University of Toronto, 2001, 5 pages, Illinois and Toronto, Canada.

Jangeun Jun, Mihail L. Sichitiu, Department of Electrical and Computer Engineering, North Carolina State University, Raleigh, NC 27695-7911, "MRP: Wireless Mesh Networks Routing Protocol", 34 pages.

Rob Flickenger, "Building Wireless Community Networks", Planning and Deploying Local Wireless Networks, Second Edition, Chapter three, pp. 19-38 (23 pages).

Joseph D. Camp, Edward W. Knightly, Electrical and Computer Engineering, Rice University, Houston, TX, The IEEE 802.11s Extended Service Set Mesh Networking Standard, 6 pages.

Prepared by the 802.11 Working Group of the IEEE 802 Committee, IEEE, 3 Park Avenue, New York, New York 10016-5997, "Draft Standard for Information Technology-Telecommunications and Information Exchange Between Systems—Local and Metropolitan area Networks—Specific Requirements—Part 11: Wireless LAN Medium Access Control (MAC) and Physical Layer (PHY) Specifications, Amendment <number>: Mesh Networking" 259 pages, 2007.

LAN MAN Standards Committee of the IEEE Computer Society, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications" Reaffirmed by the IEEE-SA Standards Board, Jun. 12, 2003. 529 pages.

* cited by examiner

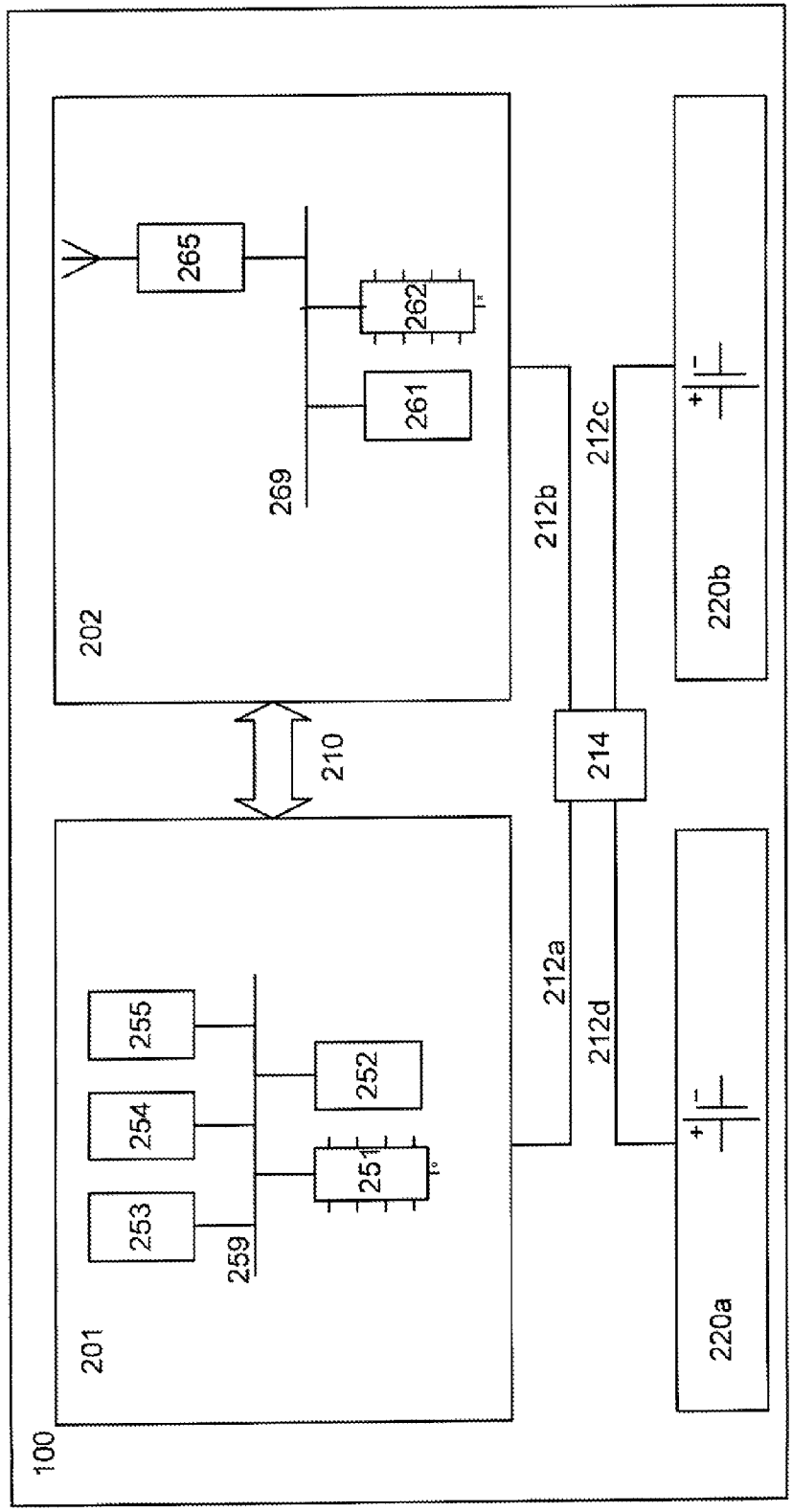

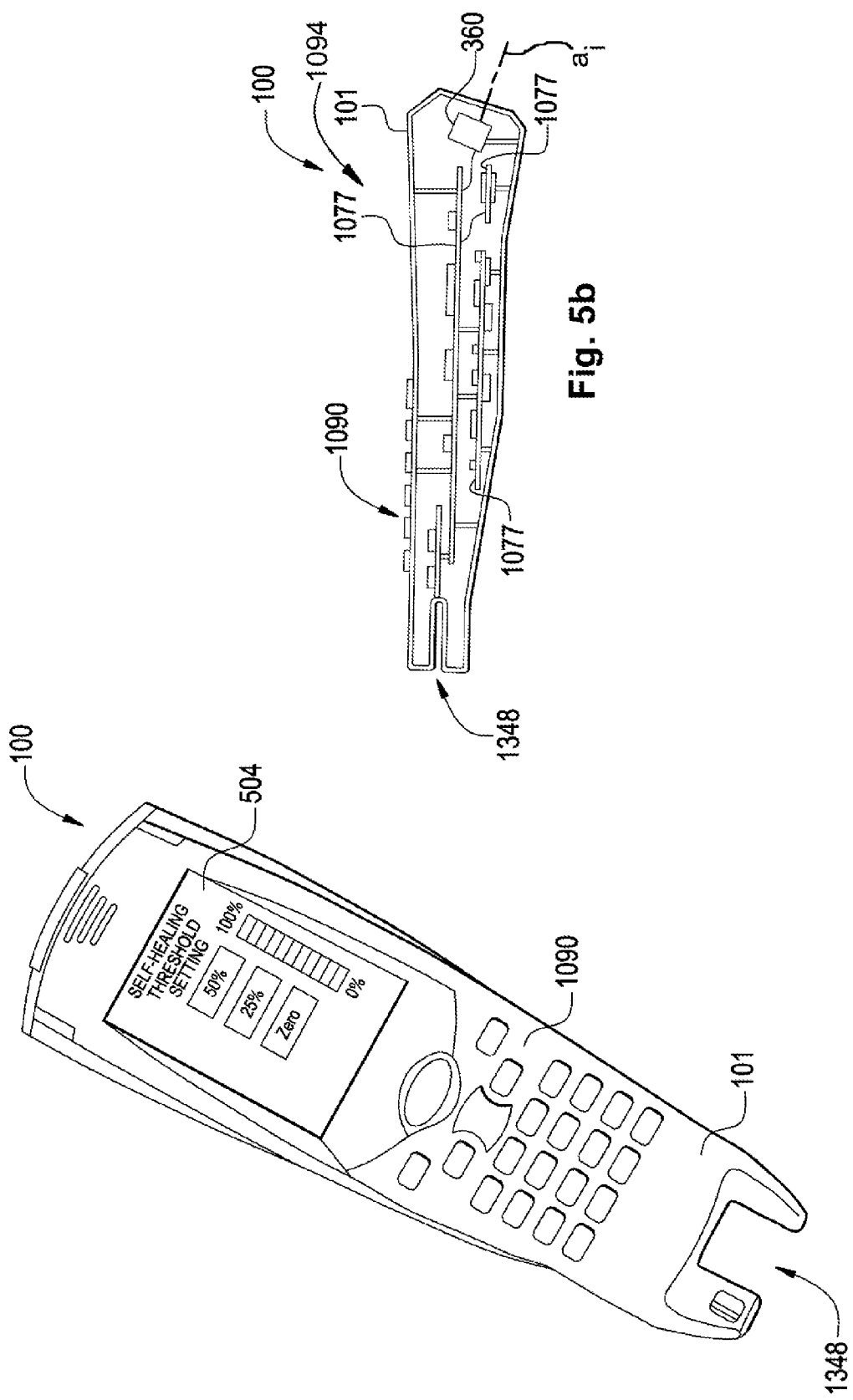

ENCODED INFORMATION READING TERMINAL WITH WIRELESS PATH SELECTION CAPABILITY

CROSS REFERENCE TO RELATED APPLICATIONS

This application is a divisional of U.S. patent application Ser. No. 13/012,379 filed Jan. 24, 2011, entitled "Encoded Information Reading Terminal With Wireless Path Selection Capability", which is a continuation of U.S. patent application Ser. No. 11/985,329 (now U.S. Pat. No. 7,874,483) filed Nov. 14, 2007, entitled "Encoded Information Reading Terminal With Wireless Path Selection Capability". Priority of each of the above applications is claimed and the disclosures of each of the above applications are incorporated herein by reference in their entirety.

FIELD OF THE INVENTION

The invention is generally related to data collection systems employing encoded information reading (EIR) terminals and is specifically related to a system and method of wireless data communication in a data collection system employing EIR terminals.

BACKGROUND OF THE INVENTION

Encoded information reading (EIR) terminals equipped with wireless communication interfaces are widely used in retail stores, shipping facilities, etc. While wireless communication of EIR terminals with host computers offer many advantages as compared to wired communications, traditional wireless networks have noticeable shortcomings, including connectivity and network throughput related issues, as well as the high cost of the wireless infrastructure. The connectivity-related issues can be caused, e.g., by "dead zones" created by metal structures and thick reinforced concrete walls within buildings. Network throughput is usually limited by the number and capacity of wireless access points and wireless portals. Attempts to improve the connectivity and throughput by increasing the number of wireless access point invariably lead to substantial growth of the infrastructure roll-out and maintenance costs.

Further, EIR terminals usually employ a power management scheme according to which a terminal would go to a sleeping state in the absence of any inputs received from the terminal operator. A terminal in a sleeping state is usually not capable of receiving data frames incoming over the terminal's wireless communication interfaces, thus burdening the frame sender with the task of performing frame buffering and retransmission attempts.

Accordingly, there is a need for further advances in EIR terminals and systems which would alleviate the connectivity, network throughput, power management, and cost-related problems.

SUMMARY OF THE INVENTION

A portable encoded information reading (EIR) terminal for incorporation in a data collection system can comprise a terminal module communicatively coupled to a wireless interface module via a wired interface. The terminal module can include a central processing unit (CPU), a memory, and an encoded information reading (EIR) device. The wireless interface module can include a microcontroller, a memory, and at least one wireless communication interface. The wireless interface module can establish one or more wireless links with one or more peer EIR terminals, to join a wireless network which is collectively formed by the peer EIR terminals. The wireless interface module can receive or transmit beacons containing at least an identifier of a path selection protocol which is used for unicast, multicast and broadcast frame transmission within the wireless network. The wireless interface module, responsive to receiving a MAC frame from the terminal module, can forward the MAC frame, according to the path selection protocol, to a peer EIR terminal or to a portal which is capable of routing MAC frames between the wireless network and one or more OSI layer 2 networks.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 2a-2c illustrate a component diagram of an EIR terminal according to the invention;

FIGS. 5a and 5b illustrate an exemplary hand held EIR terminal housing;

DETAILED DESCRIPTION OF THE INVENTION

There is provided a data collection system comprising a plurality of EIR terminals and a plurality of host computers, interconnected by one or more networks. An EIR terminal can include a central processing unit (CPU), an encoded information reading (EIR) device, and at least one wireless communication interface.

Under the teachings of the prior art, in order to allow Medium Access Control (MAC) frames originated by a wireless communication interface of an EIR terminal to be routed to a host computer which is connected to a non-wireless network, the EIR terminal must be in communication with a wireless portal, the latter routing MAC frames between the wireless network and the non-wireless network. According to the invention, an EIR terminal can establish one or more wireless links with one or more peer EIR terminals, in order to join a wireless network which is collectively formed by a plurality of EIR terminals. An EIR terminal can route a MAC frame received from one peer EIR terminal to another peer EIR terminal participating in the wireless network, to a wireless access point (AP) or a portal, so that the MAC frame can finally reach its destination within or outside of the wireless network. Thus, in an environment where there is a number of EIR terminals according to the invention which are active at any given time (e.g., a retail store floor), the requirement that an EIR terminal wishing to establish a wireless communication with a host computer must be within the direct communication range of an AP or a portal, can be eased, since the MAC frames originated by an EIR terminal which is not in the direct communication range of any AP or portal can be routed by one or more peer EIR terminals and/or wireless APs and/or portals to the final destination, which can be within or outside the wireless network. Hence, considerable cost savings can be realized due to the reduced complexity of the required wireless infrastructure. Furthermore, employing EIR terminals according to the invention can lead to the increased range and coverage of the wireless network, since participating EIR terminals can potentially cover larger area than an area that would normally be covered by traditional wireless APs supporting the same number of wireless devices under the teachings of the prior art. Besides, employing EIR terminals according to the invention can lead to an increased overall reliability and throughput of the network, due to potential existence of multiple routes interconnecting participating EIR terminals. Furthermore, employing EIR terminals according to the invention can lead to shortened roll-out periods in establishing a new wireless infrastructure due to the reduced number of wireless APs, portals, and associated cabling which need to be installed.

Figure 1:
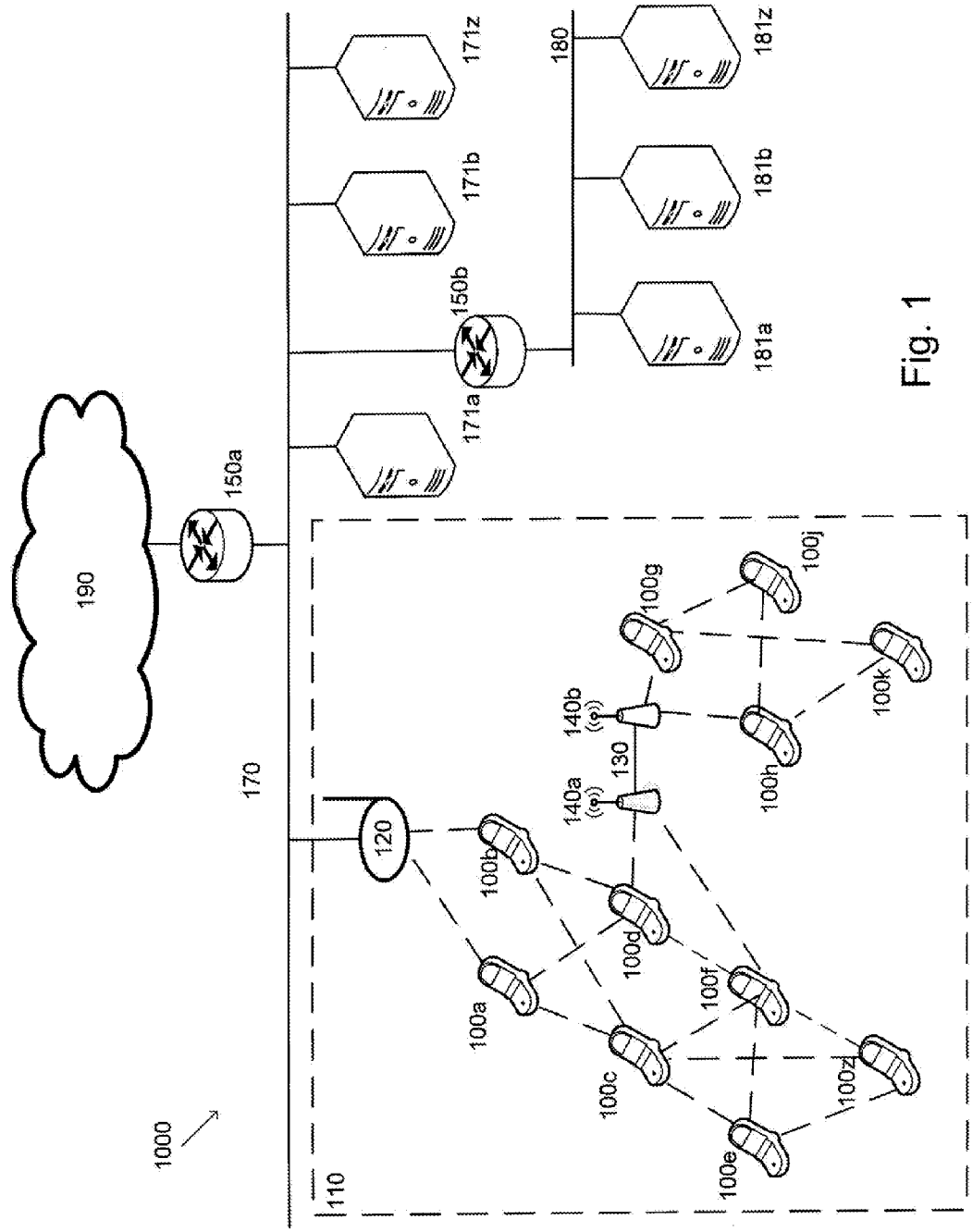
FIG. 1 depicts a network-level view of a data collection system employing EIR terminals according to the invention.

An exemplary embodiment of a data collection system according to the invention is shown in FIG. 1. The data collection system 1000 can include EIR terminals 100a-100z interconnected by at least one wireless network 110. In one aspect, the wireless network 110 can act as an OSI layer 2 network implementing IEEE 802.2 Logical Link Control, i.e., can appear to be functionally equivalent to a broadcast Ethernet-based LAN from the perspective of other networks and higher level protocols.

Figure 2A:
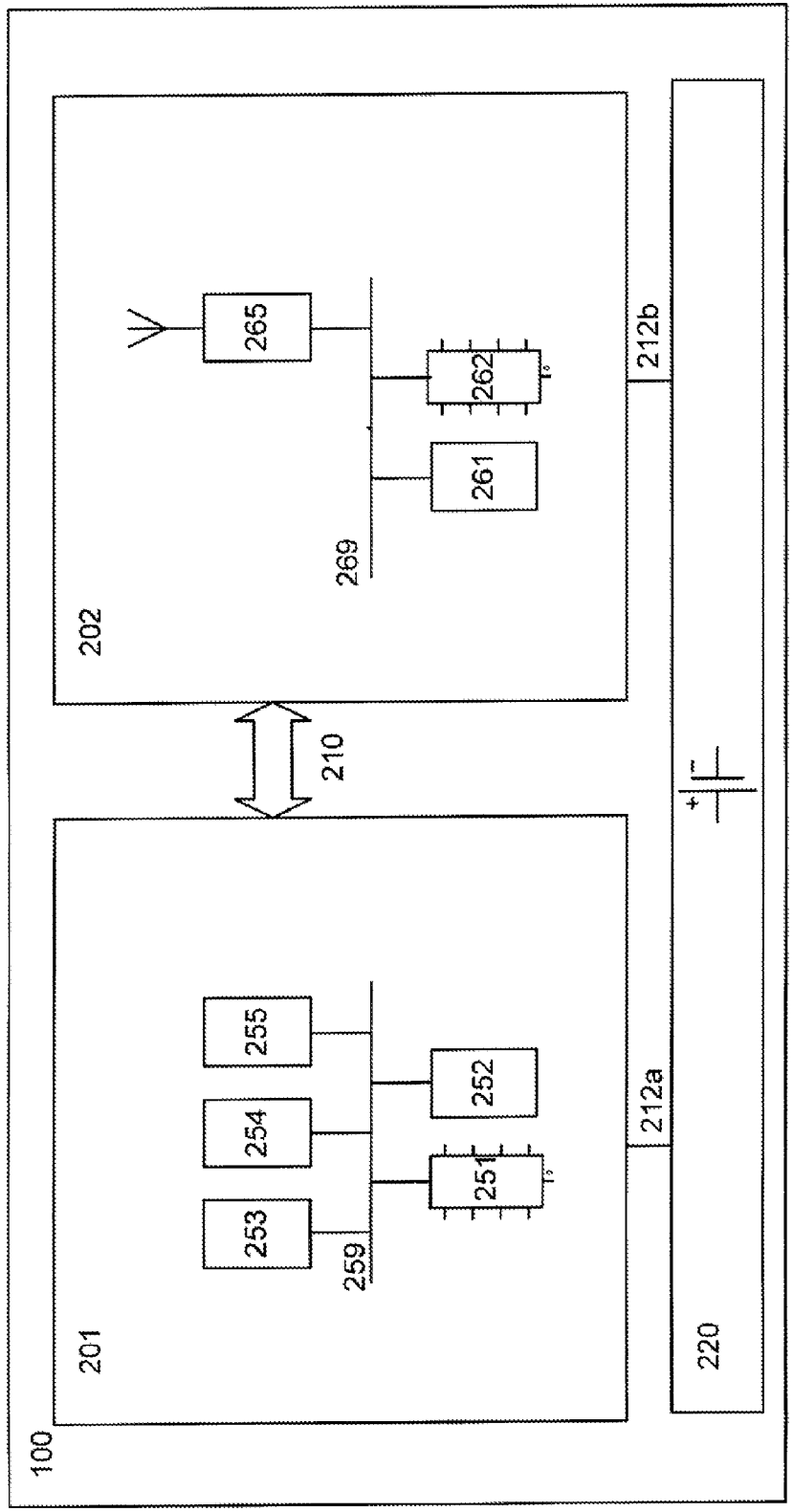

Now referring to attributes of EIR terminal 100 in further reference to FIG. 2, an EIR terminal 100 according to the invention can have a terminal module 201 and a wireless interface module 202 interconnected by a wired interface 210.

The terminal module 201 can comprise a central processing unit (CPU) 251 and a memory 252, both coupled to a system bus 259. In one embodiment, the CPU 251 can be provided by a general purpose microprocessor. The terminal module 201 can further comprise one or more encoded information reading (EIR) devices 253, including a bar code reading device, an RFID reading device, and a card reading device, also coupled to the system bus 259. In one embodiment, an EIR reading device can be capable of outputting decoded message data corresponding to an encoded message. In another embodiment, the EIR reading device can output raw message data containing an encoded message, e.g., raw image data or raw RFID data, to be processed by the CPU 251.

The terminal module 201 can further comprise a keyboard interface 254 and a display adapter 255, both also coupled to the system bus 259.

The wireless interface module can include a CPU 262 and a memory 261, both coupled to the system bus 269. In one embodiment, the CPU 262 can be provided by a microcontroller. The wireless interface module can further include one or more wireless communication interfaces 265, also coupled to the system bus 269.

In one embodiment, the EIR terminal 100 can further include a battery 220. Both the terminal module 201 and the wireless interface module 202 can be electrically coupled to the battery 220 via wirings 212a and 212b.

In another embodiment, each of the terminal module 201 and the wireless interface module 202 can include its own battery. In one dual-battery embodiment, if the wireless interface module battery becomes depleted, the wireless interface module can be powered by the terminal module battery, thus providing for uninterrupted operation of the wireless interface module. In another dual-battery embodiment, if the terminal module battery is depleted, the wireless interface module battery can be used to power the terminal module. Illustrative dual battery embodiments are described in further detail herein infra.

The wireless interface module and the terminal module of an EIR terminal according to the invention can be connected by the wired interface 210, over which the terminal module can transmit outgoing data packets to the wireless interface module. The wired interface 210 can also be employed by the wireless interface module, responsive to receiving by the wireless interface module one or more MAC frames containing one or more data packets addressed to the terminal module, to transmit the data packets to the terminal module.

Referencing FIG. 1 again, the wireless network 110 can, in one embodiment, include one or more wireless access points (AP) 140a-140b interconnected by a LAN 130. An AP can have at least one wireless communication interface and can transport MAC frames within a network comprising a plurality of EIR terminals and two or more APs interconnected via one or more LANs.

In another aspect, the data collection system 1000 can further include one or more non-wireless networks (e.g., Ethernet local area networks (LANs)) 170 and 180. LAN 170 can be connected to a wide area network (WAN) 190, e.g., the Internet, via a router 150a. LANs 170 and 180 can be interconnected via a router 150b. LAN 170 can include a plurality of computers 171a-171z. LAN 180 can include a plurality of computers 181a-181z.

The data collection system 1000 can, in one embodiment, further include one or more portals. A portal 120 can route MAC frames between a wireless network 110 and an OSI layer 2 network 170. In one embodiment, the OSI layer 2 network can be a non-wireless, e.g., Ethernet, network. In another embodiment, a portal equipped with two or more wireless interfaces or with one or more multi-channel wireless interfaces can route frames between two or more wireless networks. In one embodiment, at least one access point can be collocated with a portal.

While different networks are designated herein, it is recognized that a single network as seen from the network layer of the Open Systems Interconnection ("OSI") model can comprise a plurality of lower layer networks, e.g., what can be regarded as a single Internet Protocol ("IP") network, can include a plurality of different physical networks.

The EIR terminals 100a-100z of the data collection system 1000 can be interconnected via wireless links and thus compose a wireless network 110. In one aspect, a wireless interface module of an EIR terminal can join the wireless network 110 by establishing one or more wireless links with one or more peer EIR terminals, with an AP, or with a portal.

In one aspect, the wireless interface module of an EIR terminal can route, in accordance with a path selection protocol, one or more MAC frames received from a wireless interface module of a peer EIR terminal, an AP or a portal, and not addressed to the wireless interface module or the terminal module of the first EIR terminal. In another aspect, the wireless interface module of an EIR terminal, responsive to receiving one or more data packets from the terminal module of the EIR terminal, can incorporate the data packets into one or more MAC frames and forward the MAC frames in accordance with the path selection protocol.

The path selection protocol can be used for unicast, multicast and broadcast frame transmission within said wireless network. The path selection protocol can determine a route in accordance to which a MAC frame can be forwarded by a wireless interface module of an EIR terminal to a wireless interface module of a peer EIR terminal participating in the wireless network, to an AP, or to one or more portals, so that the MAC frame can finally reach its destination within or outside of the wireless network.

In one embodiment, an EIR terminal can further comprise an Ethernet network interface, over which the terminal be connected to the LAN 170 (e.g., when the EIR terminal can be docked to a docking station). Thus the EIR terminal can act as a portal by routing MAC frames received from peer EIR terminals to LAN 170.

In one embodiment, the path selection protocol can implement pro-active routing. A portal can broadcast a portal announcement containing a link metric (e.g., the number of hops from source to destination, or the round trip time from source to destination). An EIR terminal receiving the portal announcement can increment the link metric and re-broadcast the portal announcement. An EIR terminal receiving the portal announcement can cache the identifiers (e.g., network addresses) of one or more neighboring EIR terminals from which the portal announcement was received. In one aspect, an EIR terminal can periodically transmit route request messages to the neighboring terminals whose identifiers were cached, in order to maintain the path to the portal. In another aspect, if an EIR terminal discovers that a connection is lost to a neighboring terminal whose identifier was previously cached, the EIR terminal can notify the portal which, responsive to the notification, can update its routing information to the notifying EIR terminal.

Proactive routing can be particularly useful for wireless networks with a relatively large number of fixed infrastructure portals. Proactive routing can provide the routing information in the most efficient manner, by keeping the routing information current and not requiring an EIR terminal to transmit a routing request message before routing a MAC frame, unless no cached routing entries can be found in the EIR terminal routing table. However, in wireless networks which have a smaller number of fixed infrastructure portals and thus are much more dependent on peer EIR terminals for routing MAC frames originated by an EIR terminal, proactive routing can be less effective due to the dynamic nature of the wireless network (spatial movement and on/off switching of EIR terminals) which can lead to cache table entries storing a large number of routes which have become inactive. Thus, in wireless networks built predominantly upon mobile network clients and containing relatively small number of fixed infrastructure portals, the path selection protocol can implement on-demand routing. With on-demand routing, an EIR terminal can transmit route request messages to discover one or more routes from source to destination based on route reply messages received. In one aspect, the routes can be compared to each other based on a pre-defined link metric (e.g., the number of hops from source to destination, or the round trip time from source to destination). In another aspect, the discovered routes can be cached for later re-use.

In another embodiment, the path selection protocol can implement a hybrid routing method combining on-demand and pro-active routing.

In one embodiment, only one path selection protocol can be active at any point in time in a wireless network, to ensure that the most optimal path selection protocol is used for a particular wireless network. The only one active path selection protocol limitation can also prevent flooding the wireless network with excessive amount of routing requests and responses, e.g., in a wireless network with a relatively large number of fixed infrastructure portals where a proactive routing-based path selection algorithm is implemented.

In one aspect, an efficient way of discovering the active path selection protocol by an EIR terminal joining a wireless network can be provided by the wireless network management function. The active path selection protocol can be identified by a path selection protocol identifier which can be provided an EIR terminal joining a wireless network together with other network management information.

In one embodiment, the active path selection protocol identifier can be contained within the network management frames transmitted by a portal, an AP, or a wireless interface module of a peer EIR terminal and received by the wireless interface module of an EIR terminal joining a wireless network.

Figure 3:
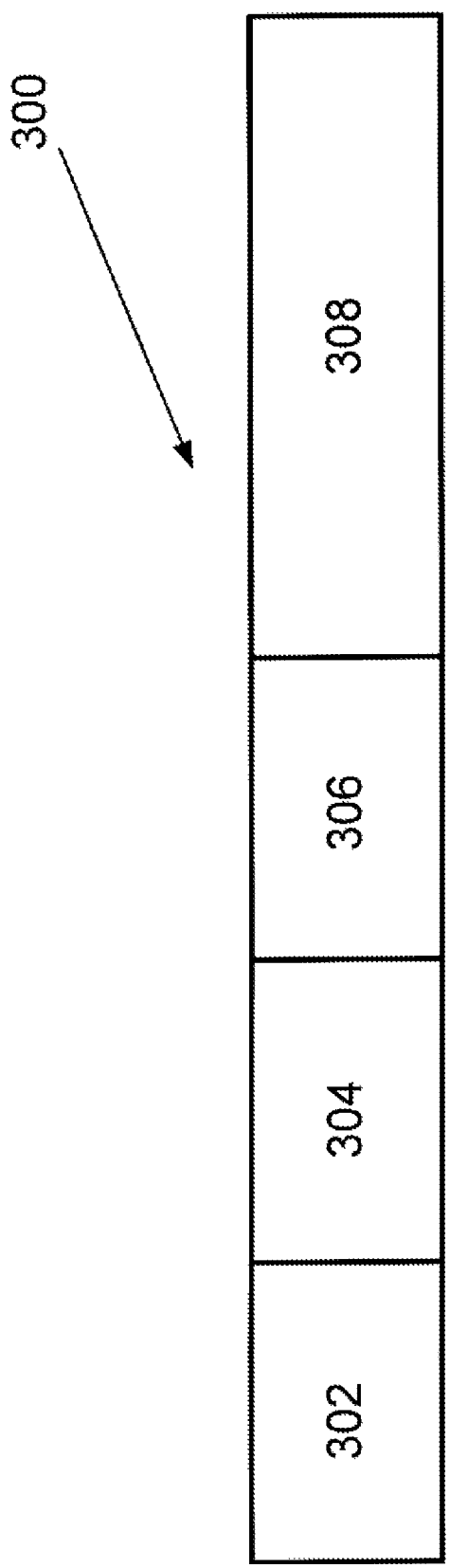
FIG. 3 illustrates an example of a network management frame structure according to the invention.

A network management frame can be included, e.g., in the beacons periodically transmitted by a portal, an AP, or a wireless interface module of an EIR terminal, and can have a structure shown in FIG. 3. The network management frame 300 can comprise a frame type identifier field 302. The frame type identifier field 302 can contain one of the pre-defined constant values identifying the frame type, e.g., 0x10 for path selection protocol parameters frame. The network management frame 300 can further comprise an active path selection protocol identifier field 304. The active path selection protocol identifier field 304 can contain one of the pre-defined constant values identifying the active path selection protocol, e.g., 0x1001 for Hybrid Wireless Mesh Protocol (HWMP). The network management frame 300 can further comprise a parameter block size field 306. The parameter block size field 306 can contain the size of the parameter block in bytes, e.g., 0x0004. The network management frame 300 can further comprise a path selection protocol parameter block field 308. The path selection protocol parameter block field 308 can contain one or more path selection protocol parameters, e.g., the recommended number of retries for a route request message.

In one aspect, a wireless network can switch to another path selection protocol to reflect a change in the network topology, e.g., a noticeable increase in the number of EIR terminals participating in a wireless network employing a proactive routing-based path selection protocol, can trigger a transition to an on-demand routing-based path selection protocol which can be more effective in the changed network topology.

In one embodiment, the features and advantages described herein supra can be yielded by an EIR terminal having a wireless interface module acting as an IEEE 802.11s-conformant mesh point. Hence, a wireless network 110 formed by EIR terminals acting as mesh points can provide a set of IEEE 802.11s-conformant mesh services, including the management of the mesh and the transport of MAC frames. Mesh paths over the wireless IEEE 802.11 links can be established using a path selection protocol, for the transfer of MAC frames between the EIR terminals participating in the wireless network.

In one aspect, an EIR terminal can choose to receive and transmit beacons either as defined in the independent basic service set (IBSS) mode of operation or as defined in the infrastructure mode of operation in IEEE 802.11. In the IBSS mode of operation, the EIR terminal can transmit a beacon if a beacon transmitted by another EIR terminal or an AP does not arrive within the beacon period plus a randomly selected short delay. In the infrastructure mode of operation, the EIR terminal can transmit beacons periodically, with a pre-defined time interval.

In another aspect, an EIR terminal can implement a beacon collision avoidance mechanism in order to reduce the chance that the terminal would transmit a beacon frame at the same time as one of neighboring peer terminals, portals, or APs. In one embodiment, an EIR terminal can implement a beacon collision avoidance mechanism defined in IEEE 802-11s standard. A terminal can select a target beacon transmission time (TBTT) that does not conflict with the neighboring peer terminals, portals or APs. An EIR terminal can adjust its timing synchronization function (TSF) timer if the terminal discovers that its TBTT can collide with the TBTT of a neighboring peer terminal, a portal or an AP. An EIR terminal can also occasionally delay its beacon frames by a pseudo-random period of time. A skilled artisan would appreciate the fact that other beacon collision avoidance mechanisms implemented by an EIR terminal are within the scope and spirit of the invention.

In a further aspect, the EIR terminal can implement an IEEE 802.11s-conformant path selection protocol, e.g., the Hybrid Wireless Mesh Protocol (HWMP). In one embodiment, the EIR terminal can further implement a Radio-Aware Optimized Link State Routing (RA-OLSR) protocol.

In another aspect, an EIR terminal can support IEEE 802.11-conformant wireless station services, including authentication, deauthentication, privacy, and MAC service data unit (MSDU) delivery. Each of the services is briefly described herein infra.

Authentication: Physical security can not be effectively employed to prevent unauthorized access to a wireless network since the wireless medium does not have precise bounds. IEEE 802.11 provides the ability to control network access via the authentication service. This service can be used by all wireless devices to establish their identity to other wireless devices with which they communicate. IEEE 802.11 supports several authentication processes, but does not mandate the use of any particular authentication scheme. IEEE 802.11 provides link-level authentication between IEEE 802.11 wireless devices, e.g., a shared key authentication. In a shared key authentication system, identity is demonstrated by knowledge of a shared secret encryption key.

Deauthentication: The deauthentication service is invoked whenever an existing authentication is to be terminated.

Privacy: Any IEEE 802.11-conformant wireless device may hear all IEEE 802.11 traffic that is within its radio range. Thus the connection of a single wireless link (without privacy) to an existing wired LAN may seriously degrade the security level of the wired LAN. To bring the functionality of the wireless LAN up to the level implicit in wired LAN design, IEEE 802.11 provides the ability to encrypt the contents of MAC frames. This functionality is provided by the privacy service. IEEE 802.11 specifies an optional privacy algorithm, Wired Equivalent Privacy (WEP), which is designed to satisfy the goal of wired LAN "equivalent" privacy.

In one embodiment, an EIR terminal can further support IEEE 802.11-conformant distribution system services, including association, disassociation, distribution, integration, and reassociation, and thus act as an AP. Each of the services is briefly described herein infra.

Association: To deliver a MAC frame within a wireless network, the distribution service needs to know which access point (AP) or portal to access for the given wireless device. This information can be provided by the association service. Before a wireless device is allowed to transmit a MAC frame via an AP or a portal, it shall first become associated with the AP or the portal. At any given time, a wireless device can be associated with no more than one AP or portal. An AP or a portal may be associated with many wireless devices at one time.

Disassociation: The disassociation service is invoked whenever an existing association is to be terminated. The disassociation service may be invoked by either party to an association (wireless device or AP).

Distribution: the distribution service delivers the MAC frame within a wireless network to the intended recipients.

Integration: If the distribution service determines that the intended recipient of a MAC frame is on a network integrated with the wireless network where the MAC frame originates, the MAC frame will need to be routed via a portal instead of an AP. The integration function is responsible for accomplishing whatever is needed to deliver a MAC frame to the integrated network.

Reassociation: Association is sufficient for no-transition MAC frame delivery between IEEE 802.11 devices. Additional functionality is needed to support device transition mobility. The additional required functionality is provided by the reassociation service which is invoked to "move" a current association from one AP to another.

Power management control implemented by an EIR terminal according to the invention is now described. In one aspect, the terminal module and the wireless interface module of an EIR according to the invention each can have associated power management logic control and each can operate in power save mode. Power management logic control of the terminal module can control the power consumption states of the terminal module between at least terminal module awake and terminal module sleeping states. In one embodiment, power management logic control of the wireless interface module can control the power consumption states of the wireless interface module between at least a wireless interface module awake and a wireless interface module sleeping states. In another embodiment, the wireless interface module can continuously operate in the wireless interface module awake state, e.g., by suspending the power management control functionality, or by having no power management control.

The EIR terminal according to the invention can be configured so that differentiated sleeping states of the terminal module and the wireless interface module can be active at a given time.

Terminal module 201 operating in power save mode can switch into the terminal module sleeping state, e.g., upon expiration of a pre-defined timeout since the last interaction with the terminal operator. In one illustrative example the EIR terminal is capable of operating in a mode in which the wireless interface module is in a wireless interface module awake state while the terminal module is in a terminal module sleeping state, so that the EIR terminal conserves power without disrupting the operation of the wireless interface module as a routing node of a wireless mesh network.

In the terminal module sleeping state, the peripheral devices of the terminal module (e.g., a display) can be powered down. The CPU of the terminal module can be halted (e.g., by the HLT instruction for Intel® x86 family of processors), and thus driven into a reduced power consumption mode.

Terminal module 201 can transition from the terminal module sleeping state to the terminal module awake state upon receiving an input via a user interface. The input can in turn trigger a hardware interrupt causing the terminal module CPU to resume processing. In another embodiment, a hardware interrupt awakening the terminal module CPU can be triggered by a wireless interface module signaling over the wired interface 210 that a data frame addressed to the PDT has been received, thus causing the terminal module 201 to transition from the terminal module sleeping state to the terminal module awake state responsive to receiving a data frame from the wireless interface module 202 over the wired interface 210.

A skilled artisan would appreciate the fact that other mechanisms of a CPU entering/exiting a low power consumption state are within the scope and the spirit of the invention.

The wireless interface module 202 power management functionality is now described. In one embodiment, the wireless interface module power save state transitions can be differentiated from the current power save state of the terminal module, e.g., the terminal module can be in the terminal module sleeping state while the wireless interface module is in the wireless interface module awake state, so that power is conserved by the EIR terminal without disrupting participation of the wireless interface module in a wireless mesh network. In another aspect, the terminal module can be in the terminal module awake state while the wireless interface module is in the wireless interface module sleeping state. In a further aspect, the wireless interface module and the terminal module can be in the wireless interface module awake state and the terminal module awake state, respectively. In a further aspect, the wireless interface module and the terminal module can be in the wireless interface module sleeping state and the terminal module sleeping state, respectively.

In one aspect, the wireless interface module responsive to receiving one or more MAC frames containing at least one data packet addressed to the terminal module can transmit the data packet to the terminal module over the wired interface 210, thus triggering a hardware interrupt which can cause the terminal module to transition to the terminal module awake state, if the terminal module was in the terminal module sleeping state. In another aspect, the wireless interface module in the wireless interface module sleeping state can transition to the wireless interface module awake state responsive to receiving a data packet from the terminal module over the wired interface 210.

In another embodiment, the wireless interface module can continuously operate in the wireless interface module awake state, e.g., by suspending the power management control functionality, or by having no power management control.

Figure 4:
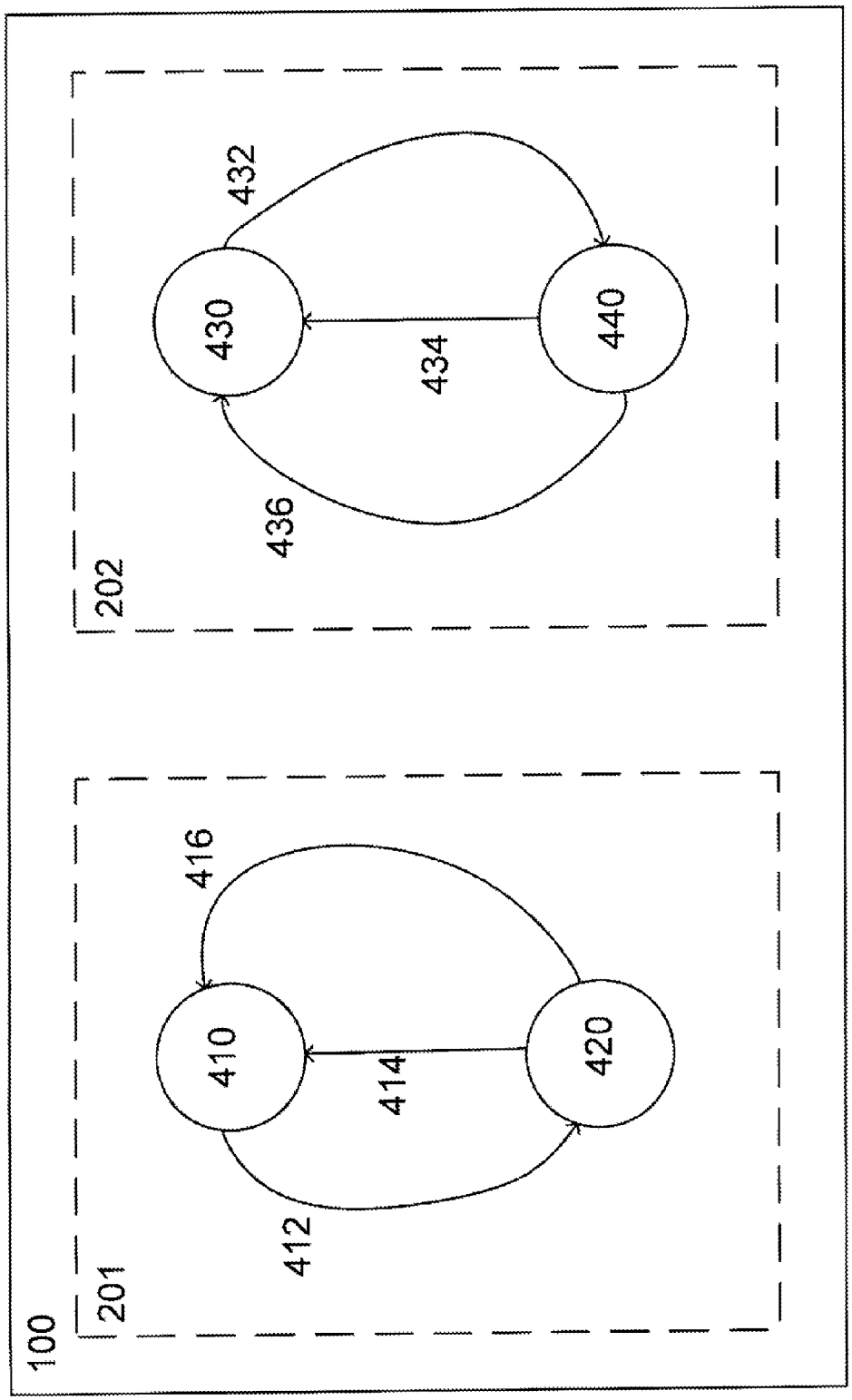
FIG. 4 illustrates a diagram of power management mode state transitions implemented by an EIR terminal according to the invention.

FIG. 4 illustrates a diagram of power management mode state transitions that can be implemented by the terminal module and the wireless interface module of an EIR terminal according to the invention.

Terminal module 201 of the EIR terminal 100 can implement a power management scheme, according to which the terminal module would transition from terminal module awake state 410 to terminal module sleeping state 420 upon expiration of a pre-defined timeout since the last interaction with the terminal operator (state transition 412). The terminal module 201 can remain in the terminal module sleeping state 420 until one of the two events occurs which would cause the terminal module 201 to transition to the terminal module awake state 410: a user interface interaction (state transition 414) or a data frame received from the wireless interface module 202 (state transition 416).

Wireless interface module 202 of the EIR terminal 100 can implement a power management scheme, according to which the wireless interface module would transition from wireless interface module awake state 430 to the wireless interface module sleeping state 440 upon satisfaction of one of the state transition conditions specified in IEEE 802.11 (state transition 432). The wireless interface module 202 can remain in the wireless interface module sleeping state 440 until one of the events occurs which would cause the wireless interface module 202 to transition to the wireless interface module awake state 430: satisfaction of one of the state transition conditions specified in IEEE 802.11 (state transition 434) or a data frame received from the terminal module 202 (state transition 436).

Battery optimization functionality of the EIR terminal according to the invention is now described. In one embodiment shown in FIG. 2a, the EIR terminal 100 can include a battery 220 supplying AC power to both terminal module 201 and wireless interface module 202, which can be electrically coupled to the battery 220 via respective wirings 212a and 212b. In another embodiment, each of the terminal module 201 and wireless interface module 202 can include its own battery.

Figure 2B:
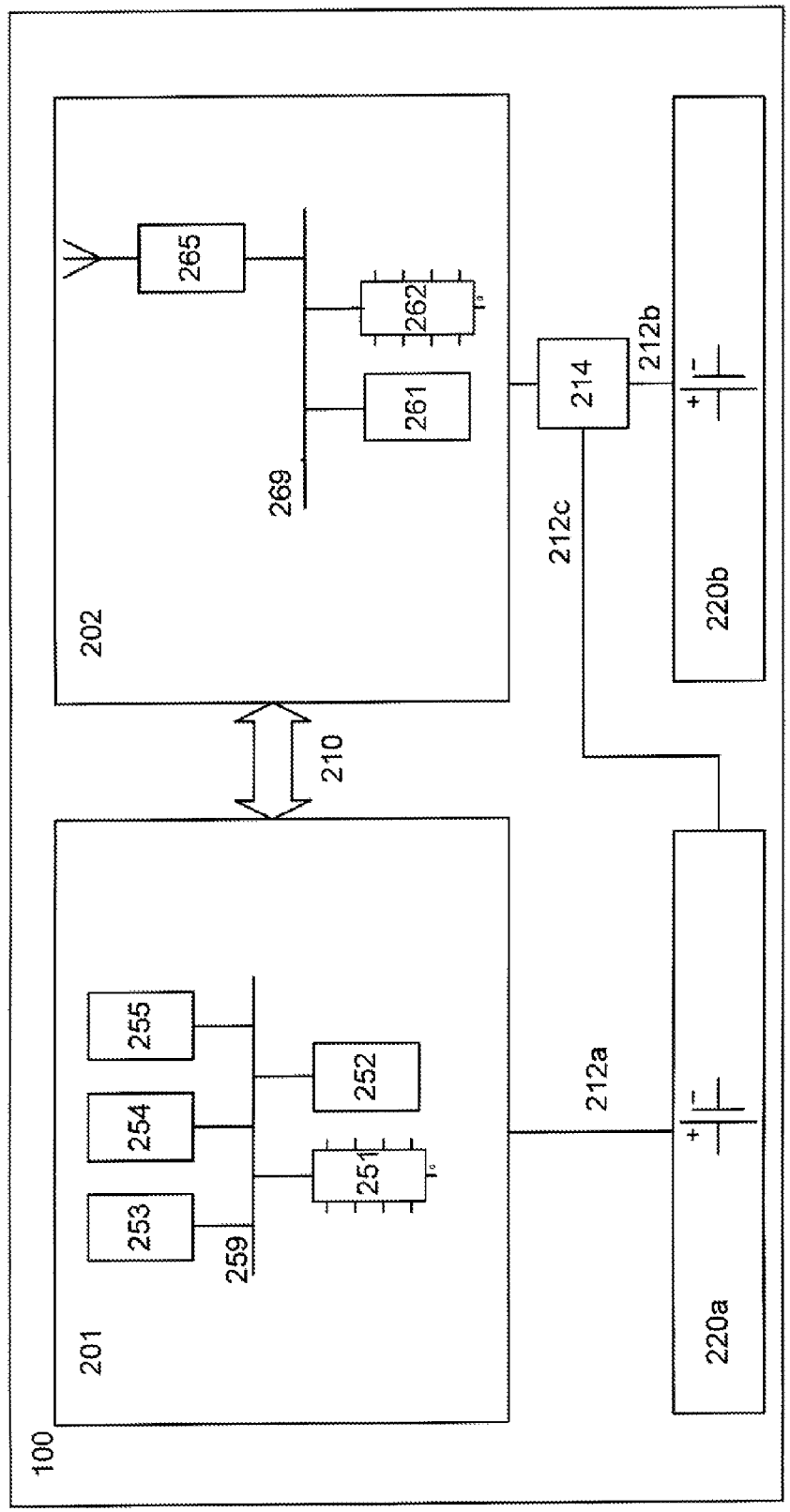

In one dual-battery embodiment shown in FIG. 2b, the terminal module 201 can be electrically coupled to the terminal module battery 220a via wirings 212a, and the wireless interface module 202 can be electrically coupled to the switch 214. In a normal operation, the switch can electrically couple the wireless interface module 202 to the wireless interface module battery 220b via wirings 212b. If the wireless interface module battery 220b becomes depleted, the switch 214 can switch the wireless interface module 202 to the terminal module battery 220a via wirings 212c, thus providing for uninterrupted operation of the wireless interface module.

In another dual-battery embodiment shown in FIG. 2c, both the terminal module 201 and the wireless interface module 202 can be electrically coupled to the switch 214. The switch 214, in turn, can be electrically coupled to both the terminal module battery 220a and the wireless interface module battery 220b. In a normal operation, the switch can electrically couple the wireless interface module 202 to the wireless interface module battery 220b via wirings 212c, and electrically couple the terminal module 201 to the terminal module battery via wirings 212d. If the wireless interface module battery 220b becomes depleted, the switch 214 can switch the wireless interface module 202 to the terminal module battery 220a via wirings 212d, thus providing for uninterrupted operation of the wireless interface module. If the terminal module battery 220a becomes depleted, the switch 214 can switch the terminal module 201 to the wireless interface module battery 220b via wirings 212c, thus providing for uninterrupted operation of the terminal module.

In one embodiment, the switch 214 can be configured to operate in a fully automatic switching mode, by performing the switching functionality described supra based upon monitoring, e.g., the voltage levels of batteries 220a and 220b. In another embodiment, the switch 214 can be controllable by the EIR terminal operator, e.g., via a graphical user interface (GUI). In a further embodiment, the switch can be controllable by a software program executed by the CPU 251.

Form factors and housings for the EIR terminal according to the invention are now being described. The components of device 100 can be incorporated into a variety of different housings. As indicated by the embodiment of FIGS. 5a and 5b, the components of FIGS. 2a and 2b can be incorporated into a hand held housing 101. EIR terminal 100 of FIGS. 5a and 5b is in the form factor of a hand held portable data terminal. EIR terminal 100 as shown in FIGS. 5a and 5b includes a keyboard 1090, a display 504 having an associated touch screen overlay, a card reader 1348, and an imaging module 360 which includes the components of imaging assembly as described herein; namely, image sensor array incorporated on an image sensor IC chip. Imaging module 360 has an associated imaging axis, $a_i$. As indicated by the side view of FIG. 5b, the components of the block diagram of FIGS. 2a and 2b may be supported within housing 101 on a plurality of circuit boards 1077. Imaging module 360 may include an image sensor array having color sensitive pixels as described in Provisional Patent Application Nos. 60/687,606, filed Jun. 3, 2005, 60/690,268, filed Jun. 14, 2005, 60/692, 890, filed Jun. 22, 2005, and 60/694,371, filed Jun. 27, 2005, all of which are entitled Digital Picture Taking Optical Reader Having Hybrid Monochrome And Color Image Sensor, and all of which are incorporated herein by reference.

Figure 6A:
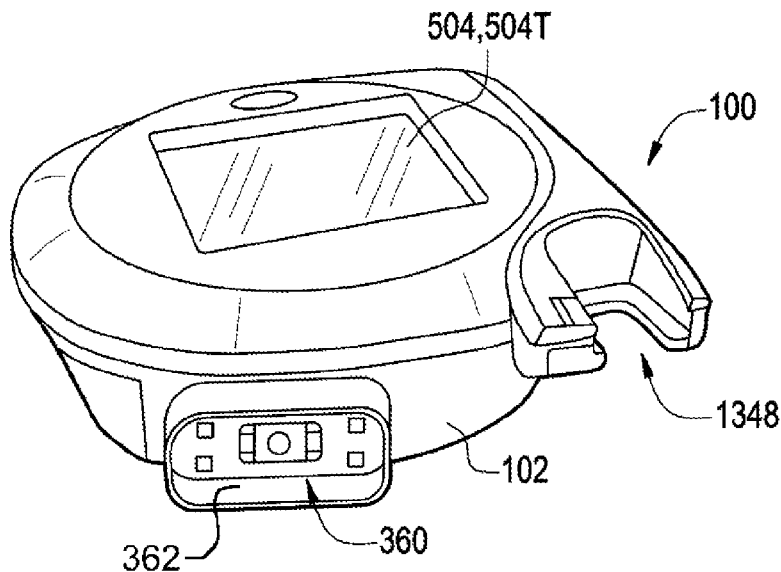
FIGS. 6a-6c illustrate an exemplary portable and remountable EIR terminal housing.
Figure 6B:
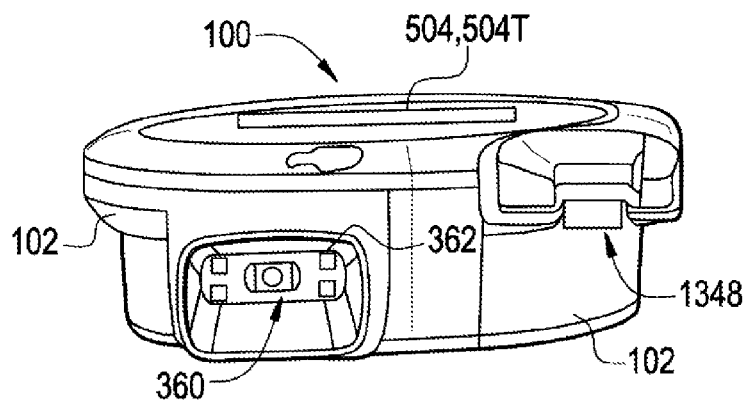
Figure 6C:
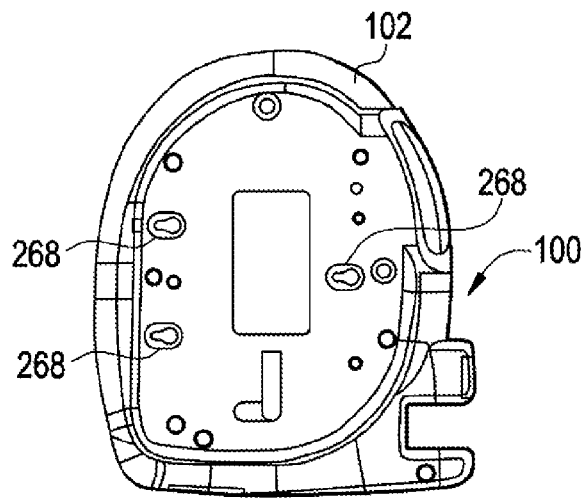

In the embodiment of FIGS. 6a-6c, the EIR terminal 100 is in the form of a transaction terminal which may be configured as a retail purchase transaction terminal or as a price verifier. Housing 102 of the transaction terminal shown in FIGS. 6a-6c is configured to be portable so that it can be moved from location to location and is further configured to be replaceably mounted on a fixed structure such as a fixed structure of a cashier station or a fixed structure of the retail store floor (e.g., a shelf, a column 264 best viewed in FIG. 7b). Referring to bottom view of FIG. 6c, the housing 102 of the EIR terminal 100 has formations 268 facilitating the replaceable mounting of EIR terminal 100 on a fixed structure. Referring now to FIG. 6b, EIR terminal 100 includes a display 504 having an associated touch screen 504T, a card reader 1348, an imaging module 360, and a luminous shroud 362. When light from the illumination block (not shown in FIG. 6) strikes luminous shroud 362, the shroud glows to attract attention to the location of imaging assembly. In certain operating modes as indicated in FIG. 7c, the EIR terminal 100 in accordance with any of FIGS. 5a-6c, displays on display 504 a PIN entry screen prompting a customer to enter PIN information into touch screen 504T. In other operating modes, as indicated in FIG. 7d, the EIR terminal 100 displays on display 504 a signature prompt screen prompting a customer to enter signature information into the device with use of a stylus 505.

Figure 7A:
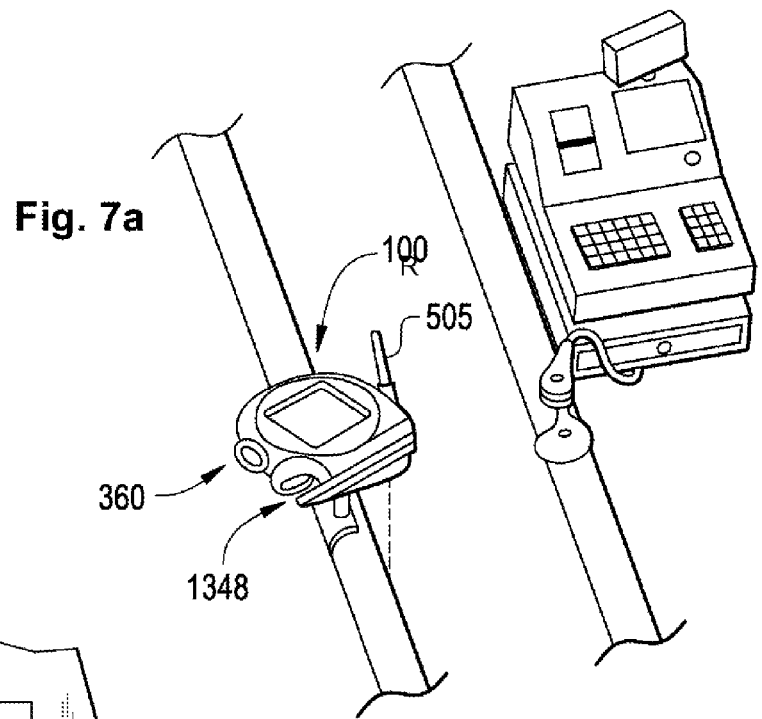
FIG. 7a illustrates a first exemplary deployment of an EIR terminal according to the invention within a retail store.
Figure 7C:
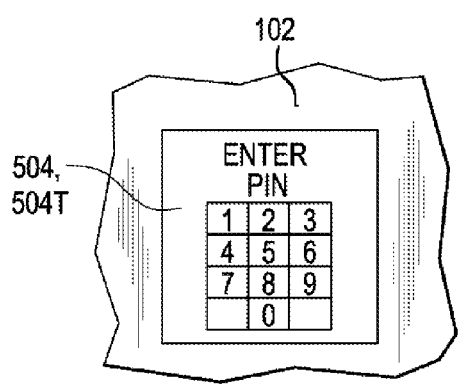
FIGS. 7c and 7d illustrate PIN and signature data entry operational modes of an EIR terminal according to the invention.
Figure 7B:
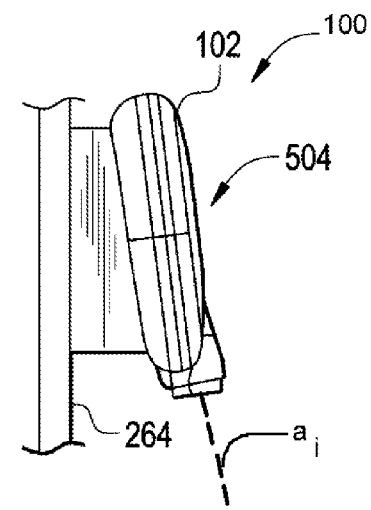
FIG. 7b illustrates a second exemplary deployment of an EIR terminal according to the invention within a retail store.
Figure 7D:
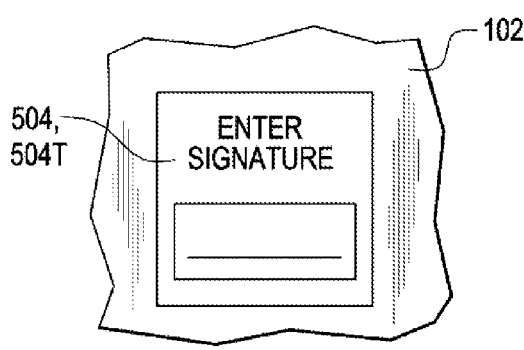

Referring to FIGS. 7a and 7b, various installation configurations for the EIR terminal of FIGS. 5a-6c are shown. In the view of FIG. 7a, the EIR terminal 100 is installed as a retail purchase transaction terminal at a point of sale cashier station. In the setup of FIG. 7a, the EIR terminal 100 is configured as a retail purchase transaction terminal and is utilized to aid and facilitate retail transactions at a point of sale. A customer may enter a credit card or a debit card into card reader 1348 and retail purchase transaction terminal 100R may transmit the credit card information to credit/debit authorization network.

In the view of FIG. 7b, the EIR terminal 100 is configured as a price verifier to aid customers in checking prices of products located on a store floor. EIR terminal 100 may be mounted on a shelf (not shown in FIG. 7b) or on a column 264 or other fixed structure of the retail store. EIR terminal 100 may decode bar code data from bar codes on store products and transmit decoded out bar code messages to a store server for lookup of price information which is sent back from the store server to terminal 100 for display on display 504.

By combining a terminal module and a wireless interface module within a single EIR terminal according to the invention, all the advantages accorded by employing wireless EIR terminals can be fully realized, and the cost of deploying and supporting of the wireless infrastructure can be dramatically decreased, by minimizing the number of wireless APs and portals needed to provide the wireless connectivity to a fleet of portable EIR terminals. Furthermore, employing EIR terminals according to the invention can increase the range of wireless network coverage as compared to traditional wireless network with fixed APs and portals, as well as improve the network reliability since a mesh network can provide multiple network paths connecting any given wireless EIR terminal to an AP, a portal, or a peer EIR terminal. The availability of multiple network paths can also cause increasing of the overall network throughput.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A portable encoded information reading (EIR) terminal for incorporation in a data collection system can comprise a terminal module communicatively coupled to a wireless interface module via a wired interface. The terminal module can include a central processing unit (CPU), a memory, and an encoded information reading (EIR) device. The wireless interface module can include a microcontroller, a memory, and at least one wireless communication interface. The wireless interface module can establish one or more wireless links with one or more peer EIR terminals, to join a wireless network which is collectively formed by the peer EIR terminals. The wireless interface module can receive or transmit beacons containing at least an identifier of a path selection protocol which is used for unicast, multicast and broadcast frame transmission within the wireless network. The wireless interface module, responsive to receiving a MAC frame from the terminal module, can forward the MAC frame, according to the path selection protocol, to a peer EIR terminal or to a portal which is capable of routing MAC frames between the wireless network and one or more OSI layer 2 networks.

A small sample of systems methods and apparatus that are described herein is as follows:

A1. There is provided a portable encoded information reading (EIR) terminal for incorporation in a data collection system having a plurality of peer EIR terminals, said plurality of peer EIR terminal collectively forming a wireless network, said wireless network being an OSI layer 2 network, said wireless network comprising zero or more wireless access points, said wireless network further comprising zero or more portals, each portal routing MAC frames between said wireless network and at least one OSI layer 2 network, said EIR terminal comprising: a terminal module including a central processing unit (CPU), a memory, and an encoded information reading (EIR) device selected from the group consisting of a bar code reading device, an RFID reading device, and a card reading device, said EIR device configured to perform one of: outputting raw message data containing an encoded message, outputting decoded message data corresponding to an encoded message; and a wireless interface module communicatively coupled to said terminal module via a wired interface, said wireless interface module including a microcontroller, a memory, and at least one wireless communication interface; wherein said wireless interface module establishes one or more wireless links with one or more EIR terminals of said plurality of peer EIR terminals, to join said wireless network; wherein said wireless interface module performs at least one of: receiving beacons, transmitting beacons, said beacons containing at least an identifier of a path selection protocol, said path selection protocol being used for unicast, multicast and broadcast frame transmission within said wireless network; wherein said wireless interface module, responsive to receiving one or more data packets from said terminal module, incorporates said one or more data packets into one or more MAC frames and forwards said one or more MAC frames, according to said path selection protocol, to one of: a peer EIR terminal, a wireless access point, one or more of said portals; and wherein said wireless interface module, responsive to receiving one or more MAC frames, said one or more MAC frames containing one or more data packet addressed to said terminal module, transmits said one or more data packets to said terminal module.

A2. There is also provided the EIR terminal of (A1), wherein said receiving beacons and transmitting beacons is performed according to one of: IEEE 802.11 Independent Basic Service Set (IBSS) mode of operation, IEEE 802.11 infrastructure mode of operation.

A3. There is also provided the EIR terminal of (A1), wherein said wireless interface module performs IEEE 802.11-conformant wireless station services including authentication, de-authentication, privacy, and MAC service data unit delivery; and wherein said wireless interface module further performs IEEE 802.11-conformant wireless distribution system services including association, disassociation, distribution, integration, and re-association.

A4. There is also provided the EIR terminal of (A1), wherein said wireless interface module employs a power management scheme for controlling power management states of said wireless interface module at least between a wireless interface module awake state and a wireless interface module sleeping state; wherein said terminal module employs a power management scheme for controlling power management states of said terminal module at least between a terminal module awake state and a terminal module sleeping state; and wherein said EIR terminal is capable of operating in a mode in which said terminal module is in said terminal module sleeping state and said wireless interface module is in said wireless interface module awake state in such manner that power is conserved by said EIR terminal without disrupting participation of said wireless interface module in said mesh network.

A5. There is also provided the EIR terminal of (A1), wherein said wireless interface module employs a power management scheme for controlling power management states of said wireless interface module at least between a wireless interface module awake state and a wireless interface module sleeping state; wherein said terminal module employs a power management scheme for controlling power management states of said terminal module at least between a terminal module awake state and a terminal module sleeping state; and wherein said wireless interface module causes said terminal module to exit said terminal module sleeping state by transmitting at least one data packet to said terminal module.

A6. There is also provided the EIR terminal of (A1), wherein said wireless interface module employs a power management scheme for controlling power management states of said wireless interface module at least between a wireless interface module awake state and a wireless interface module sleeping state; wherein said terminal module employs a power management scheme for controlling power management states of said terminal module at least between a terminal module awake state and a terminal module sleeping state; and wherein said terminal module causes said wireless interface module to exit said wireless interface module sleeping state by transmitting at least one data packet to said wireless interface module.

A7. There is also provided the EIR terminal of (A1), wherein said terminal module includes a first battery; wherein said wireless interface module includes a second battery; and wherein said first battery is used to power said wireless interface module responsive to said second battery depletion, thus providing for uninterrupted operation of said wireless interface module.

A8. There is also provided the EIR terminal of (A1), wherein said path selection protocol is the only path selection protocol being used for unicast, multicast and broadcast frame transmission within said wireless network.

B1. In addition, there is provided a portable encoded information reading (EIR) terminal for incorporation in a data collection system having a plurality of peer EIR terminals, said plurality of peer EIR terminal collectively forming a wireless network, said wireless network being an OSI layer 2 network, said wireless network comprising zero or more wireless access points, said wireless network further comprising zero or more portals, each portal routing MAC frames between said wireless network and at least one OSI layer 2 network, said EIR terminal comprising: a terminal module including a central processing unit (CPU), a memory, and an encoded information reading (EIR) device selected from the group consisting of a bar code reading device, an RFID reading device, and a card reading device, said EIR device configured to perform one of: outputting raw message data containing an encoded message, outputting decoded message data corresponding to an encoded message; and a wireless interface module communicatively coupled to said terminal module via a wired interface, said wireless interface module including a microcontroller, a memory, and at least one wireless communication interface; wherein said wireless interface module establishes one or more wireless links with one or more EIR terminals of said plurality of peer EIR terminals, to join said wireless network; wherein said wireless interface module employs a power management scheme for controlling power management states of said wireless interface module at least between a wireless interface module awake state and a wireless interface module sleeping state; wherein said terminal module employs a power management scheme for controlling power management states of said terminal module at least between a terminal module awake state and a terminal module sleeping state; and wherein said EIR terminal is capable of operating in a mode in which said terminal module is in said terminal module sleeping state and said wireless interface module is in said wireless interface module awake state in such manner that power is conserved by said EIR terminal without disrupting participation of said wireless interface module in said mesh network.

B2 There is also provided the EIR terminal of (B1), wherein said wireless interface module performs at least one of: receiving beacons, transmitting beacons, said beacons containing at least an identifier of a path selection protocol, said path selection protocol being used for unicast, multicast and broadcast frame transmission within said wireless network.

B3. There is also provided the EIR terminal of (B1), wherein said wireless interface module, responsive to receiving one or more data packets from said terminal module, incorporates said one or more data packets into one or more MAC frames and forwards said one or more MAC frames to one of: a peer EIR terminal, a wireless access point, one or more of said portals.

B4. There is also provided the EIR terminal of (B1), wherein said wireless interface module, responsive to receiving one or more MAC frames, said one or more MAC frames containing one or more data packet addressed to said terminal module, transmits said one or more data packets to said terminal module.

B5. There is also provided the EIR terminal of (B1), wherein said wireless interface module performs IEEE 802.11-conformant wireless station services including authentication, de-authentication, privacy, and MAC service data unit delivery; and wherein said wireless interface module further performs IEEE 802.11-conformant wireless distribution system services including association, disassociation, distribution, integration, and re-association.

B6. There is also provided the EIR terminal of (B1), wherein said wireless interface module continuously operates in said wireless interface module awake state.

C1. In addition, there is provided a portable encoded information reading (EIR) terminal for incorporation in a data collection system having a plurality of peer EIR terminals, said plurality of peer EIR terminal collectively forming a wireless network, said wireless network being an OSI layer 2 network, said wireless network comprising zero or more wireless access points, said wireless network further comprising zero or more portals, each portal routing MAC frames between said wireless network and at least one OSI layer 2 network, said EIR terminal comprising: a terminal module including a central processing unit (CPU), a memory, and an encoded information reading (EIR) device selected from the group consisting of a bar code reading device, an RFID reading device, and a card reading device, said EIR device configured to perform one of: outputting raw message data containing an encoded message, outputting decoded message data corresponding to an encoded message; and a wireless interface module communicatively coupled to said terminal module via a wired interface, said wireless interface module including a microcontroller, a memory, and at least one wireless communication interface; wherein said wireless interface module establishes one or more wireless links with one or more EIR terminals of said plurality of peer EIR terminals, to join said wireless network; wherein said wireless interface module employs a power management scheme for controlling power management states of said wireless interface module at least between a wireless interface module awake state and a wireless interface module sleeping state; wherein said terminal module employs a power management scheme for controlling power management states of said terminal module at least between a terminal module awake state and a terminal module sleeping state; wherein said wireless interface module causes said terminal module to exit said terminal module sleeping state by transmitting at least one data packet to said terminal module; and wherein said terminal module causes said wireless interface module to exit said wireless interface module sleeping state by transmitting at least one data packet to said wireless interface module.

C2. There is also provided the EIR terminal of (C1), wherein said wireless interface module performs at least one of: receiving beacons, transmitting beacons, said beacons containing at least an identifier of a path selection protocol, said path selection protocol being used for unicast, multicast and broadcast frame transmission within said wireless network.

C3. There is also provided the EIR terminal of (C1), wherein said wireless interface module, responsive to receiving one or more data packets from said terminal module, incorporates said one or more data packets into one or more MAC frames and forwards said one or more MAC frames to one of: a peer EIR terminal, a wireless access point, one or more of said portals.

C4. There is also provided the EIR terminal of (C1), wherein said wireless interface module, responsive to receiving one or more MAC frames, said one or more MAC frames containing one or more data packet addressed to said terminal module, transmits said one or more data packets to said terminal module.

C5. There is also provided the EIR terminal of (C1), wherein said wireless interface module performs IEEE 802.11-conformant wireless station services including authentication, de-authentication, privacy, and MAC service data unit delivery; and wherein said wireless interface module further performs IEEE 802.11-conformant wireless distribution system services including association, disassociation, distribution, integration, and re-association.

D1. In addition, there is provided a portable encoded information reading (EIR) terminal for incorporation in a data collection system having a plurality of peer EIR terminals, said plurality of peer EIR terminal collectively forming a wireless network, said wireless network being an OSI layer 2 network, said wireless network comprising zero or more wireless access points, said wireless network further comprising zero or more portals, each portal routing MAC frames between said wireless network and at least one OSI layer 2 network, said EIR terminal comprising: a terminal module including a first battery, a central processing unit (CPU), a memory, and an encoded information reading (EIR) device selected from the group consisting of a bar code reading device, an RFID reading device, and a card reading device, said EIR device configured to perform one of: outputting raw message data containing an encoded message, outputting decoded message data corresponding to an encoded message; and a wireless interface module communicatively coupled to said terminal module via a wired interface, said wireless interface module including a second battery, a microcontroller, a memory, and at least one wireless communication interface; wherein said wireless interface module establishes one or more wireless links with one or more EIR terminals of said plurality of peer EIR terminals, to join said wireless network; and wherein said first battery is used to power said wireless interface module responsive to said second battery depletion, thus providing for uninterrupted operation of said wireless interface module.

D2. There is also provided the EIR terminal of (D1), wherein said wireless interface is electrically coupled to a switching means; wherein in a normal operation, said switching means electrically couple said wireless interface module to said second battery; and wherein said switching means conditionally, upon depletion of said second battery, electrically couple said wireless interface module to said first battery.

D3. There is also provided the EIR terminal of (D1), wherein said wireless interface is electrically coupled to a switching means; wherein in a normal operation, said switching means electrically couple said terminal module to said first battery; and wherein said switching means conditionally, upon depletion of said first battery, electrically couple said terminal module to said second battery.

D4. There is also provided the EIR terminal of (D1), wherein said wireless interface module performs at least one of: receiving beacons, transmitting beacons, said beacons containing at least an identifier of a path selection protocol, said path selection protocol being used for unicast, multicast and broadcast frame transmission within said wireless network.

D5. There is also provided the EIR terminal of (D1), wherein said wireless interface module performs IEEE 802.11-conformant wireless station services including authentication, de-authentication, privacy, and MAC service data unit delivery; wherein said wireless interface module further performs IEEE 802.11-conformant wireless distribution system services including association, disassociation, distribution, integration, and re-association.

E1. In addition, there is provided a data collection system comprising a plurality of encoded information reading (EIR) terminals, each of said EIR terminals comprising a terminal module including a central processing unit (CPU), a memory, and an encoded information reading (EIR) device selected from the group consisting of a bar code reading device, an RFID reading device, and a card reading device, said EIR device configured to perform one of: outputting raw message data containing an encoded message, outputting decoded message data corresponding to an encoded message; each of said EIR terminals further comprising a wireless interface module communicatively coupled to said terminal module via a wired interface, said wireless interface module including a CPU, a memory, and at least one wireless communication interface; wherein said plurality of EIR terminals collectively form a wireless network in which each EIR terminal is directly connected via a wireless link to one or more peer EIR terminals, said wireless network being an OSI layer 2 network, said wireless network comprising zero or more wireless access points, said wireless network further comprising zero or more portals, each portal routing MAC frames between said wireless network and at least one OSI layer 2 network; wherein said wireless interface modules of at least three EIR terminals of said plurality of EIR terminals performs at least one of: receiving beacons, transmitting beacons, said beacons containing at least an identifier of a path selection protocol, said path selection protocol being used for unicast, multicast and broadcast frame transmission within said wireless network; wherein a wireless interface module of a first EIR terminal, responsive to receiving one or more MAC frames from a wireless interface module of a second EIR terminal, said one or more MAC frames containing one or more data packet addressed to said terminal module of said first EIR terminal, transmits said one or more data packets to said terminal module of said first EIR terminal; and wherein a wireless interface module of a first EIR terminal, responsive to receiving one or more MAC frames from a wireless interface module of a second EIR terminal, said one or more MAC frames not addressed to said wireless interface module or said terminal module of said first EIR terminal, forwards said one or more MAC frames, according to said path selection protocol, to one of: a wireless interface module of a third EIR terminal, a wireless access point, one or more of said portals.

E2. There is also provided the data collection system of (E1), wherein said wireless interface modules of said at least three EIR terminals of said plurality of EIR terminals perform IEEE 802.11-conformant wireless station services including authentication, de-authentication, privacy, and MAC service data unit delivery; and wherein said wireless interface modules of said at least three EIR terminals of said plurality of EIR terminals further perform IEEE 802.11-conformant wireless distribution system services including association, disassociation, distribution, integration, and re-association.

E3. There is also provided the data collection system of (E1), wherein wireless interface module performs IEEE 802.11-conformant wireless station services including authentication, de-authentication, privacy, and MAC service data unit delivery; and wherein said wireless interface module further performs IEEE 802.11-conformant wireless distribution system services including association, disassociation, distribution, integration, and re-association.

E4. There is also provided the data collection system of (E1), wherein at least one said wireless access point is collocated with at least one said portal.

E5. There is also provided the data collection system of (E1), wherein a first EIR terminal further comprises an Ethernet network interface, said first EIR terminal connecting to a local area network (LAN) over said Ethernet network interface; and wherein said first EIR terminal, responsive to receiving one or more MAC frames from a wireless interface module of a second EIR terminal, said one or more MAC frames not addressed to said wireless interface module or said terminal module of said first EIR terminal, forwards said one or more MAC frames to said LAN via said Ethernet network interface.

E6. There is also provided the data collection system of (E1), wherein said path selection protocol is the only path selection protocol being used for unicast, multicast and broadcast frame transmission within said wireless network.

While the present invention has been described with reference to a number of specific embodiments, it will be understood that the true spirit and scope of the invention should be determined only with respect to claims that can be supported by the present specification. Further, while in numerous cases herein systems and apparatuses and methods are described as having a certain number of elements, it will be understood that such systems, apparatuses and methods can be practiced with fewer than the mentioned certain number of elements.

The invention claimed is:

1. A portable encoded information reading (EIR) terminal for incorporation in a data collection system having a plurality of peer EIR terminals, said plurality of peer EIR terminal collectively forming a wireless network, said wireless network being an OSI layer 2 network, said wireless network comprising zero or more wireless access points, said wireless network further comprising zero or more portals, each portal routing MAC frames between said wireless network and at least one OSI layer 2 network, said EIR terminal comprising:

a terminal module including a central processing unit (CPU), a memory, and an encoded information reading (EIR) device selected from the group consisting of a bar code reading device, an RFID reading device, and a card reading device, said EIR device configured to perform one of: outputting raw message data containing an encoded message, outputting decoded message data corresponding to an encoded message;

a wireless interface module communicatively coupled to said terminal module via a wired interface, said wireless interface module including a microcontroller, a memory, and at least one wireless communication interface;

wherein said wireless interface module is configured to establish one or more wireless links with one or more EIR terminals of said plurality of peer EIR terminals, to join said wireless network; and wherein said wireless interface module is further configured, responsive to receiving a portal announcement, to cache one or more network addresses of devices having originated said portal announcement.

2. The EIR terminal of claim 1, wherein said wireless interface module is further configured, responsive to receiving one or more data packets from said terminal module, to incorporate said one or more data packets into one or more MAC frames and forward said one or more MAC frames to one of: a peer EIR terminal, a wireless access point, one or more of said portals.

3. The EIR terminal of claim 1, wherein said wireless interface module is configured, responsive to receiving one or more MAC frames containing one or more data packet addressed to said terminal module, to transmit said one or more data packets to said terminal module.

4. The EIR terminal of claim 1, wherein said wireless interface module is further configured to periodically transmit a route request message to said one or more network addresses.

5. The EIR terminal of claim 1, wherein said wireless interface module is further configured to periodically transmit a route request message to said one or more network addresses; and
wherein said wireless interface module is further configured, responsive to establishing that a connection to at least one address of said one or more network addresses is lost, to transmit a notification to a portal having originated said portal announcement.

6. The EIR terminal of claim 1, wherein said wireless interface module is further configured, responsive to receiving a portal announcement including a link metric, to re-broadcast said portal announcement.

7. The EIR terminal of claim 1, wherein said wireless interface module performs IEEE 802.11-conformant wireless station services including authentication, de-authentication, privacy, and MAC service data unit delivery; and
wherein said wireless interface module further performs IEEE 802.11-conformant wireless distribution system services including association, disassociation, distribution, integration, and re-association.

8. The EIR terminal of claim 1, wherein said wireless interface module is further configured to perform at least one of: receiving beacons and transmitting beacons, said beacons containing at least an identifier of a path selection protocol, said path selection protocol being used for unicast, multicast and broadcast frame transmission within said wireless network.

9. The EIR terminal of claim 8, wherein said path selection protocol is the only path selection protocol being used for unicast, multicast and broadcast frame transmission within said wireless network.

10. The EIR terminal of claim 8, wherein said receiving of beacons and transmitting of beacons is performed according to one of: IEEE 802.11 Independent Basic Service Set (IBSS) mode of operation, IEEE 802.11 infrastructure mode of operation.

11. A portable encoded information reading (EIR) terminal for incorporation in a data collection system having a plurality of peer EIR terminals, said plurality of peer EIR terminal collectively forming a wireless network, said wireless network being an OSI layer 2 network, said wireless network comprising zero or more wireless access points, said wireless network further comprising zero or more portals, each portal routing MAC frames between said wireless network and at least one OSI layer 2 network, said EIR terminal comprising:
a terminal module including a central processing unit (CPU), a memory, and an encoded information reading (EIR) device selected from the group consisting of a bar code reading device, an RFID reading device, and a card reading device, said EIR device configured to perform one of: outputting raw message data containing an encoded message, outputting decoded message data corresponding to an encoded message;
a wireless interface module communicatively coupled to said terminal module via a wired interface, said wireless interface module including a microcontroller, a memory, and at least one wireless communication interface;
wherein said wireless interface module is configured to establish one or more wireless links with one or more EIR terminals of said plurality of peer EIR terminals, to join said wireless network; and
wherein said wireless interface module is further configured to implement at least one of: an on-demand routing method, a proactive routing method, a hybrid routing method.

12. The EIR terminal of claim 11, wherein said wireless interface module is configured to implement said on-demand routing method by transmitting, responsive to receiving from said terminal module one or more data packets addressed to an external device having a network address, one or more route request messages, in order to determine one or more routes to said network address based on one or more route reply messages received.

13. The EIR terminal of claim 12, wherein said wireless interface module is configured to compare said one or more routes based on a pre-defined link metric.

14. The EIR terminal of claim 11, wherein said wireless interface module is configured to implement said proactive routing method by caching one or more network addresses of devices having originated a portal announcement.

15. The EIR terminal of claim 11, wherein said wireless interface module is further configured, responsive to receiving one or more data packets from said terminal module, to incorporate said one or more data packets into one or more MAC frames and forward said one or more MAC frames to one of: a peer EIR terminal, a wireless access point, one or more of said portals.

16. The EIR terminal of claim 11, wherein said wireless interface module is configured, responsive to receiving one or more MAC frames containing one or more data packet addressed to said terminal module, to transmit said one or more data packets to said terminal module.

17. The EIR terminal of claim 11, wherein said wireless interface module performs IEEE 802.11-conformant wireless station services including authentication, de-authentication, privacy, and MAC service data unit delivery; and
wherein said wireless interface module further performs IEEE 802.11-conformant wireless distribution system services including association, disassociation, distribution, integration, and re-association.

18. The EIR terminal of claim 11, wherein said wireless interface module is further configured to perform at least one of: receiving beacons and transmitting beacons, said beacons containing at least an identifier of a path selection protocol, said path selection protocol being used for unicast, multicast and broadcast frame transmission within said wireless network.

19. The EIR terminal of claim 18, wherein said path selection protocol is the only path selection protocol being used for unicast, multicast and broadcast frame transmission within said wireless network.

20. The EIR terminal of claim 18, wherein said receiving of beacons and transmitting of beacons is performed according to one of: IEEE 802.11 Independent Basic Service Set (IBSS) mode of operation, IEEE 802.11 infrastructure mode of operation.

* * * * *